(12) United States Patent
Thompson et al.

(10) Patent No.: US 8,670,648 B2
(45) Date of Patent: Mar. 11, 2014

(54) VIDEO PROCESSING METHODS AND SYSTEMS

(75) Inventors: Raymond Thompson, Southborough, MA (US); Steven C. Quinn, Newington, NH (US)

(73) Assignee: XOS Technologies, Inc., North Billerica, MA (US)

( * ) Notice: Subject to any disclaimer, the term of this patent is extended or adjusted under 35 U.S.C. 154(b) by 251 days.

(21) Appl. No.: 13/015,813

(22) Filed: Jan. 28, 2011

(65) Prior Publication Data

US 2012/0027379 A1 Feb. 2, 2012

Related U.S. Application Data

(60) Provisional application No. 61/299,685, filed on Jan. 29, 2010.

(51) Int. Cl.
*H04N 9/80* (2006.01)

(52) U.S. Cl.
USPC .............................. 386/241; 386/239; 386/248

(58) Field of Classification Search
USPC .................................. 386/239–248, 291–299
See application file for complete search history.

(56) References Cited

U.S. PATENT DOCUMENTS

| | | | |
|---|---|---|---|
| 5,917,990 A | 6/1999 | Zamara et al. | |
| 5,999,696 A * | 12/1999 | Tsuga et al. | 386/337 |
| 6,378,132 B1 | 4/2002 | Grandin et al. | |
| 6,637,032 B1 | 10/2003 | Feinleib | |
| 6,986,153 B1 | 1/2006 | Ridderheim et al. | |
| 2002/0191952 A1 * | 12/2002 | Fiore et al. | 386/46 |
| 2003/0095790 A1 * | 5/2003 | Joshi | 386/69 |
| 2003/0098869 A1 | 5/2003 | Arnold et al. | |
| 2003/0222981 A1 * | 12/2003 | Kisak et al. | 348/148 |
| 2004/0013406 A1 * | 1/2004 | Barton et al. | 386/69 |
| 2004/0111465 A1 | 6/2004 | Chuang et al. | |
| 2006/0024026 A1 * | 2/2006 | Yamashita et al. | 386/83 |
| 2007/0250863 A1 | 10/2007 | Ferguson | |
| 2007/0294621 A1 | 12/2007 | Hansen et al. | |
| 2007/0296864 A1 * | 12/2007 | Kim | 348/564 |
| 2007/0300249 A1 | 12/2007 | Smith et al. | |
| 2008/0064490 A1 * | 3/2008 | Ellis | 463/25 |

(Continued)

OTHER PUBLICATIONS

"Avid Interplay Archive, Search & Retrieve", Jan. 21, 2011, Publisher: Avid; http://www.avid.com/US/products/family/interplay/archive-search-retrieve.

NCAA, Vault, Classic NCAA Men's Basketball Tournament Games, http://vault.ncaa.com, copyright 2010.

*Primary Examiner* — Hung Dang

(74) *Attorney, Agent, or Firm* — Parsons Behle & Latimer

(57) ABSTRACT

Video processing methods include correlating a video frame in a video stream with event data in a data stream based on a video frame time stamp and an event data time stamp, the time stamps being based on a time scale that is independent, and recording the correlation in a database. Other video processing methods include receiving a query for a video frame and searching for event data in a database. The database has an event data table and a video data table used in locating the video frame. Further video processing methods include receiving a query to retrieve a video clip for each of a plurality of plays, searching for event data in a database, locating the video clip for each of the plurality of plays, and compiling the video clips into a compiled video stream lacking video frames that do not satisfy the query.

42 Claims, 4 Drawing Sheets

(56) References Cited

U.S. PATENT DOCUMENTS

| | | |
|---|---|---|
| 2008/0127257 A1* | 5/2008 | Kvache .................... 725/39 |
| 2009/0043869 A1 | 2/2009 | Hansen et al. |
| 2009/0074235 A1 | 3/2009 | Lahr et al. |
| 2009/0077471 A1 | 3/2009 | Lahr et al. |
| 2009/0097815 A1 | 4/2009 | Lahr et al. |
| 2009/0226148 A1 | 9/2009 | Nesvadba et al. |
| 2009/0307267 A1 | 12/2009 | Chen et al. |

* cited by examiner

Game Data Table

| Record | Game Identifier | Play | Participants | Time Stamp |
|---|---|---|---|---|
| 1 | X | Blocked Shot | Player B | 21:43:10 UTC |
| 2 | Y | Field Goal Attempt | Player C | 18:28:13 UTC |
| 3 | X | Jump Shot | Player D | 21:43:25 UTC |
| ... | ... | ... | ... | ... |

Video Data Table

| Record | Game Identifier | Description | Time Stamp (Start) | Duration |
|---|---|---|---|---|
| 1 | X | Laker vs. Celtics | 21:05:00 UTC | 3:31:00 |
| 2 | Y | Arkansas vs. LSU | 15:00:00 UTC | 4:05:00 |
| 3 | Z | Timberwolves vs. Bucks | 21:07:50 UTC | 2:22:50 |
| ... | ... | ... | ... | ... |

FIG. 3

VIDEO PROCESSING METHODS AND SYSTEMS

RELATED APPLICATION DATA

The present application claims the benefit of priority under 35 U.S.C. §119 to U.S. Provisional Application No. 61/299,685 filed Jan. 29, 2010, entitled System and Method for Correlation and Editing of Event Video and Event Data, which is incorporated herein by reference.

TECHNICAL FIELD

The present invention relates generally to video processing and more specifically to a system and method for correlation and editing of event video and event data.

BACKGROUND

Traditional video processing systems allow an operator to edit a video stream of a sporting event to create "highlight" clips. In traditional systems, the operator must manually scan through a video stream to locate a portion of the video stream that corresponds to a particular play. This process is time consuming. Further, traditional systems do not allow end-users to create customized video clips for particular plays. In addition, traditional systems limit the variety of video clips that are accessible to end-users.

SUMMARY

In accordance with the present disclosure, the disadvantages and problems associated with prior video processing systems have been substantially reduced or eliminated.

Video processing methods include correlating a video frame in a video stream with event data in a data stream based on a video frame time stamp and an event data time stamp, the time stamps being based on a time scale that is independent, and recording the correlation in a database.

Other video processing methods include receiving a query for a video frame and searching for event data in a database. The database has an event data table and a video data table used in locating the video frame.

Further video processing methods include receiving a query to retrieve a video clip for each of a plurality of plays, searching for event data in a database, locating the video clip for each of the plurality of plays, and compiling the video clips into a compiled video stream lacking video frames that do not satisfy the query.

In some embodiments, a video processing system comprises a memory that stores at least one data stream comprising game data for a sporting event. The game data may be associated with a plurality of plays that occurred in the sporting event. The video processing system may further comprise a processor that is communicatively coupled to the memory and that receives at least one video stream associated with the sporting event. The video stream may comprise a respective set of video frames for each of the plurality of plays that occurred in the sporting event. The processor may tag the at least one video stream with a plurality of time stamps such that a particular video frame is associated with a time stamp representing when a play associated with the video frame occurred. Each of the plurality of time stamps may be based on a time scale that is independent of the video stream. The processor may correlate the at least one video stream with the game data in the at least one data stream based at least in part on the plurality of time stamps. In response to a query specifying game data for a particular play, the processor may determine a video clip of the particular play in the at least one video stream based at least in part on one or more time stamps associated with the specified game data. The processor may cause a graphical user interface to display the video clip.

The present disclosure provides various technical advantages. Various embodiments may have none, some, or all of these advantages. One advantage is that the video processing system may correlate (e.g., synchronize) a video stream for an event with a data stream comprising game data (e.g., statistical data) associated with the event. The system may correlate the video stream and the data stream based on independent time stamps appended to the video stream and/or data stream. By correlating the video stream and data stream for an event, the system may allow an end user to efficiently search for and view a video clip of any play that occurred in the event. In addition, or alternatively, the system may allow an end user to formulate a query for retrieving video clips of particular types of plays (e.g., all field goals made by a particular player, all slam dunks made by a particular team, etc.). Thus, the system may allow the end user to efficiently create a customized video that includes video clips for desired types of plays. Yet another advantage is that the system may allow customized video clips to be retrieved and launched by selecting statistical data in a graphical display. For example, an end user that views a box score for an event may cause a graphical user interface to launch a video clip of a particular play by selecting data in the box score associated with the play. Other advantages of the present invention will be readily apparent to one skilled in the art from the description and the appended claims.

BRIEF DESCRIPTION OF THE DRAWINGS

For a more complete understanding of the present disclosure and its advantages, reference is now made to the following description taken in conjunction with the accompanying drawings, in which:

FIG. 3 illustrates a database comprising game data and video data stored in the video processing system, according to certain embodiments.

DETAILED DESCRIPTION

Figure 1:
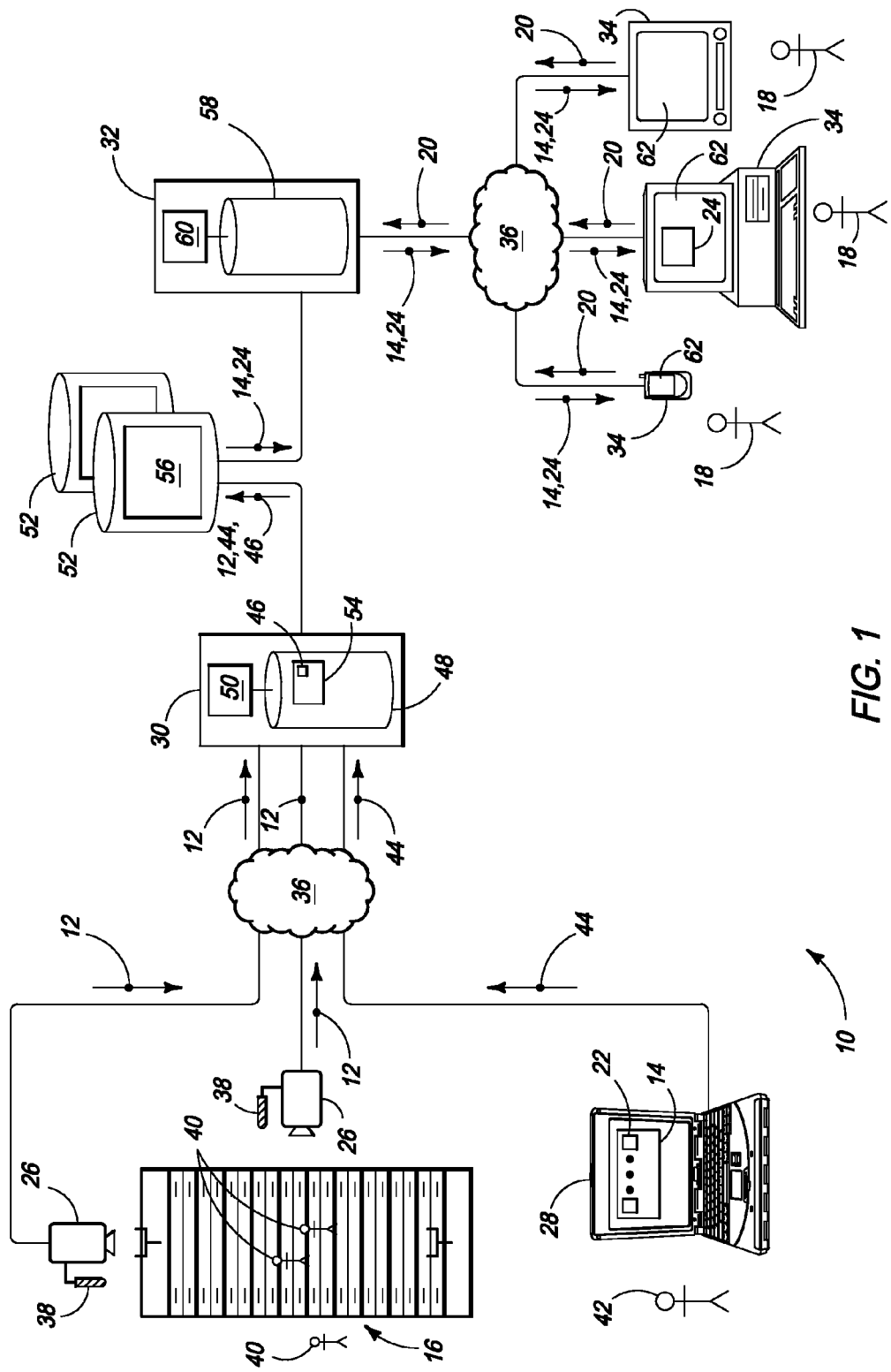
FIG. 1 illustrates a video processing system, according to certain embodiments.

FIG. 1 illustrates a video processing system 10, according to certain embodiments. System 10 is generally operable to capture, process, and correlate video streams 12 with game data 14 associated with events 16. System 10 may display game data 14 to users 18 and receive queries 20 based on particular plays 22 that occurred during events 16. In response to query 20 based on a particular play 22, system 10 may in real-time or near real-time retrieve and display a video clip 24 of the particular play 22. Thus, system 10 may allow user 18 to quickly retrieve and view video clip 24 of any play 22 that occurred during event 16. System 10 may comprise one or more cameras 26, data consoles 28, manager servers 30, content servers 32, and clients 34 communicatively coupled by one or more networks 36.

Camera 26 is generally operable to capture, record, process, and/or transmit video images of event 16. Camera 26 may capture the movement of an object as a sequence of images. Each successive image in the sequence may be referred to as a frame. Collectively, the frames may be processed and played to represent a scene in motion. A sequence of frames may be referred to as video stream 12.

In some embodiments, camera 26 records video stream 12 on a tangible storage medium such as, for example, a video tape, optical disc, hard disc, flash memory, film, and/or other suitable storage medium. In addition, or alternatively, camera 26 may transmit video stream 12 in real-time or near real-time via network 36 to one or more components of system 10. In some embodiments, camera 26 transmits video stream 12 to manager server 30.

Camera 26 may be any suitable type of image capture device. For example, camera 26 may be a digital camera, analog camera, closed-circuit television camera, studio camera, and/or portable camera. In some embodiments, camera 26 comprises a microphone 38 and/or other audio capture device. Thus, video stream 12 may comprise both sounds and images (audio and video) of a particular event 16.

As noted above, system 10 may comprise one or more cameras 26 that capture audio and video of events 16 at various venues. Event 16 may refer to any suitable type of event such as, for example, a game, contest, competition, concert, and/or other activity. In some embodiments, event 16 comprises a sporting event such as, for example, a football game, basketball game, baseball game, soccer game, golf match, horse race, automobile race, and/or track meet. Event 16 may comprise a game involving participants 40 (e.g., players) competing as individuals or as teams. In some embodiments, participants 40 in event 16 may execute one or more plays 22 that contribute to the outcome of event 16.

Play 22 may refer to a particular action, attempt, movement, and/or strategy executed by one or more participants 40 in event 16. For example, in a football game, play 22 may refer to passing the football, handing off the football to a running back, attempting to kick a field goal, tackling a player, and/or scoring a touchdown. As another example, in a basketball game, play 22 may refer to an offensive play such as, for example, a jump shot, lay up, slam dunk, tip, offensive rebound, and/or foul. Similarly, play 22 may refer to a defensive play such as, for example, a blocked shot, defensive rebound, and/or steal. As yet another example, in an automobile race, play 22 may refer to passing another automobile, making a pit stop, causing a crash, and/or crossing the finish line. Each event 16 may comprise a plurality of respective plays 22 executed by one or more participants 40 in event 16.

As noted above, system 10 may comprise one or more data consoles 28. Data consoles 28 may allow system 10 to gather game data 14 regarding events 16. Game data 14 may comprise any suitable information regarding plays 22 executed during event 16. In particular, game data 14 may comprise information regarding the sequence of plays 22 that occurred during event 16. For example, if event 16 is a football game, game data 14 may comprise a log of each pass, hand-off, tackle, kick, touchdown, turnover, and/or time-out that occurred during the football game.

In some embodiments, observer 42 of event 16 may, in real-time or near real-time, input game data 14 regarding event 16 into data console 28. For example, if event 16 is a football game, observer 42 may input into data console 28 information regarding each play 22 executed during the football game. As an illustration, when a player catches a pass, observer 42 may input into data console 28 the identity of the receiver, the identity of the passer, and the fact that the pass was completed. Data console 28 may transmit game data 14 as a data stream 44 to manager server 30 via one or more networks 36.

Data console 28 may comprise any suitable device for the input and/or capture of game data 14. Data console 28 may comprise a computer, workstation, Internet browser, electronic notebook, Personal Digital Assistant (PDA), and/or any other suitable device (wireless, wired, or otherwise), component, or element capable of receiving, processing, storing, and/or communicating information with other components of system 10. Data console 28 may comprise any suitable user interface such as a display, microphone, keyboard, mouse, touch screen, and/or any other appropriate terminal equipment according to particular configurations and arrangements. Data console 28 may display and/or comprise drop-down menus, lists, buttons, and/or other interfaces that expedite the entry of game data 14 by observer 42. It will be understood that system 10 may comprise any number and combination of data consoles 28.

Manager server 30 in system 10 may receive one or more data streams 44 from data consoles 28 and one or more video streams 12 from cameras 26. Manager server 30 may receive video streams 12 from cameras 26 directly or via one or more intermediary components of system 10 (e.g., via one or more video servers). Manager server 30 is generally operable to, in real-time or near real-time, process and synchronize data stream 44 for a particular event 16 with one or more video streams 12 for the particular event 16. Manager server 30 may synchronize data stream 44 with video stream 12 according to time information that is independent of data stream 44 and/or video stream 12. In particular, upon receiving video stream 12, manager server 30 may tag video stream 12 with a plurality of time stamps 46. Time stamps 46 may be based on a universal time scale such as, for example, Coordinated Universal Time (UTC), International Atomic Time (TAI), UNIX time, Network Time Protocol (NTP), Global Positioning System (GPS) signals, global synchronization, and/or any suitable time scale. For example, time stamps 46 may be based on Universal Time (UT), which is a time scale based on the rotation of the earth as monitored by the International Earth Rotations and Reference Systems Service (IERS) or other suitable entity. Thus, time stamps 46 may be independent of and not relative to the amount of time elapsed since the start of video recording and/or capture.

Tagging video stream 12 with time stamps 46 may refer to appending, embedding, attaching, marking, and/or coding time stamps 46 in video stream 12. In embodiments where video stream 12 comprises digital video, manager server 30 may include time stamps 46 as meta-data in a digital video file. In addition, or alternatively, manager server 30 may include time stamps 46 as time-code data embedded within the video essence. Manager server 30 may tag each frame in video stream 12 with a respective time stamp 46. Alternatively, manager server 30 may tag a subset of the frames in video stream 12 (e.g., every fifth frame, tenth frame, and/or other suitable interval) with a respective time stamp 46.

In some embodiments, manager server 30 receives data stream 44 from data console 28 in real-time over one or more IP sockets. In other embodiments, manager server 30 receives data stream 44 during and/or after event 16 as an Extensible Markup Language (XML) stream and/or file. Manager server 30 may, in conjunction with tagging video stream 12, tag data stream 44 from data console 28 with a plurality of time stamps 46 that are independent of and not relative to the creation and/or transmission of game data 14. Alternatively, data console 28 may be configured to tag data stream 44 with time stamps 46 prior to transmitting data stream 44 to manager server 30. Tagging data stream 44 with time stamps 46 may refer to appending, embedding, attaching, marking, and/or coding time stamps 46 in data stream 44. Each play 22 of game data 14 in data stream 44 may be associated with a respective time stamp 46.

Based at least in part on time stamps 46, manager server 30 may correlate particular game data 14 in data stream 44 with particular frames in video stream 12. Manager server 30 may generate one or more indices and/or tables that correlate game data 14 with frames of video stream 12 based at least in part on time stamps 46. This correlation may allow user 18 of system 10 to submit a query 20 based on game data 14 for a particular play 22 and to efficiently retrieve video of the particular play 22. For example, assume that game data 14 of a football game indicates that, in the second quarter, a particular play 22 occurred in which Player A caught a pass. User 18 may submit to system 10 a query 20 based on the particular play 22 (i.e. Player A catching a pass in the second quarter). System 10 may process the query 20 by identifying in game data 14 the particular time stamp 46 associated with the particular play 22. System 10 may then retrieve one or more frames of video stream 12 that are tagged with the same or a similar time stamp 46. System 10 may then display the retrieved frames as video clip 24. (System may comprise default and/or customizable settings for configuring video clip 46 to comprise a certain number of frames (e.g., sixty frames, two hundred frames, etc.) preceding and/or following the particular time stamp 46.) Thus, by using time stamps 46 to correlate game data 14 in data stream 44 with portions of video stream 12, system 10 may allow user 18 to efficiently retrieve video clip 24 of any play 22 that occurred during event 16.

Manager server 30 in system 10 may comprise any suitable combination of hardware and/or software implemented in one or more modules to provide the described functions and operations. In some embodiments, manager server 30 may comprise a blade server, a general-purpose personal computer (PC) (running a WINDOWS™, MAC™, or other operating system), a workstation, a computer running a UNIX™ operating system, a server computer, and/or any suitable processing device. In some embodiments, the functions and operations described above may be performed by a pool of multiple manager servers 30. A particular manager server 30 may comprise a memory 48 and a processor 50.

Memory 48 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates memory 48 as internal to manager server 30, it should be understood that memory 48 may be internal or external to manager server 30, depending on particular implementations. Also, memory 48 may be separate from or integral to other memory devices, such as storage modules 52, to achieve any suitable arrangement of memory devices for use in system 10.

Memory 48 is generally operable to store timing module 54. Timing module 54 generally comprises algorithms, code, rules, tables, and/or other suitable instructions for tagging video stream 12 and/or data stream 44 with time stamps 46 and/or for correlating video stream 12 with data stream 44.

Memory 48 is communicatively coupled to processor 50. Processor 50 is generally operable to execute timing module 54 stored in memory 48 to perform the described functions and operations. Processor 50 may comprise any suitable combination of hardware and/or software implemented in one or more modules to provide the described functions and operations.

Manager server 30 may be communicatively coupled to one or more storage modules 52. Storage module 52 is generally operable to store one or more databases 56 that comprise tagged video streams 12, tagged data streams 44, and/or tables (e.g., indices) that correlate the tagged video streams 12 and data streams 44. In some embodiments, database 56 is a relational database such as, for example, a Structured Query Language (SQL) database. In other embodiments, database 56 is an object-oriented database, an XML database, a network database, and/or a hierarchical database.

Storage module 52 may store any number and combination of databases 56. Storage module 52 may represent any memory device, direct access storage device (DASD), or database module and may take the form of volatile or non-volatile memory comprising, without limitation, magnetic media, optical media, random access memory (RAM), read-only memory (ROM), removable media, or any other suitable local or remote memory component.

Storage module 52 may be communicatively coupled to content server 32. Content server 32 is generally operable to receive queries 20 from users 18 and to locate and transmit video clips 24 and/or game data 14 in response to queries 20. A particular query 20 may identify a particular play 22 that occurred in a particular event 16. For example, a particular query 20 may identify a jump shot made by Player B in the third quarter of a basketball game. Content server 32 may process the query 20 and identify the time stamp 46 associated with the particular play 22 in game data 14 in database 56. Based on the identified time stamp 46, content server 32 may retrieve from database 56 a particular video clip 24 that is associated with the time of the identified time stamp 46. In the above example, content server 32 may retrieve video clip 24 of the jump shot made by Player B in the third quarter. Content server 32 may cause the retrieved video clip 24 to be displayed to the user 18.

Content server 32 in system 10 may comprise any suitable combination of hardware and/or software implemented in one or more modules to provide the described functions and operations. Content server 32 may comprise a blade server, a general-purpose personal computer (PC) (running a WINDOWS™, MAC™, or other operating system), a workstation, a computer running a UNIX™ operating system, a server computer, and/or any suitable processing device. In some embodiments, the functions and operations described above may be performed by a pool of multiple content servers 32. A particular content server 32 may comprise a memory 58 and a processor 60.

Memory 58 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information.

Memory 58 is communicatively coupled to processor 60. Processor 60 is generally operable to execute software stored in memory 58 to perform the described functions and operations. Processor 60 may comprise any suitable combination of hardware and software implemented in one or more modules to provide the described functions and operations.

Content server 32 may be communicatively coupled with one or more clients 34 via network 36. Client 34 is generally operable to display game data 14 to a user 18, to receive a query 20 from the user 18, and/or to display video clips 24 to the user 18. Client 34 represents any suitable local or remote end-user device that may be used by users 18 to access one or more elements of system 10, such as the content server 32. Client 34 may comprise a computer, workstation, Internet browser, electronic notebook, Personal Digital Assistant (PDA), television, set top box, pager, cell phone, or any other suitable device (wireless, wired, or otherwise), component, or element capable of receiving, processing, storing, and/or communicating information with other components of system 10. Client 34 may also comprise any suitable user interface such as a display, microphone, keyboard, and/or any other appropriate terminal equipment according to particular configurations and arrangements. It will be understood that system 10 may comprise any number and combination of clients 34.

In some embodiments, client 34 comprises a graphical user interface (GUI) 62. GUI 62 is generally operable to tailor and filter data presented to the user 18. GUI 62 may provide the user 18 with an efficient and user-friendly presentation of game data 14 and/or video clips 24 for one or more events 16. GUI 62 may comprise a plurality of displays having interactive fields, pull-down lists, and buttons operated by the user 18. GUI 62 may include multiple levels of abstraction including groupings and boundaries. It should be understood that the term graphical user interface may be used in the singular or in the plural to describe one or more graphical user interfaces and each of the displays of a particular graphical user interface.

As explained above, cameras 26, data consoles 28, manager server 30, content server 32, and clients 34 may be communicatively coupled via one or more networks 36. Network 36 may represent any number and combination of wired and/or wireless networks suitable for data transmission. Network 36 may, for example, communicate internet protocol packets, frame relay frames, asynchronous transfer mode cells, and/or other suitable information between network addresses. Network 36 may include one or more intranets, local area networks, metropolitan area networks, wide area networks, cellular networks, all or a portion of the Internet, and/or any other communication system or systems at one or more locations.

It should be understood that the internal structure of system 10 and the servers, processors, and memory devices associated therewith is not limited to the structure shown and described. The structure of system 10 may be changed, modified, rearranged, or reconfigured and still achieve the intended operations of system 10 described herein.

Figure 2:
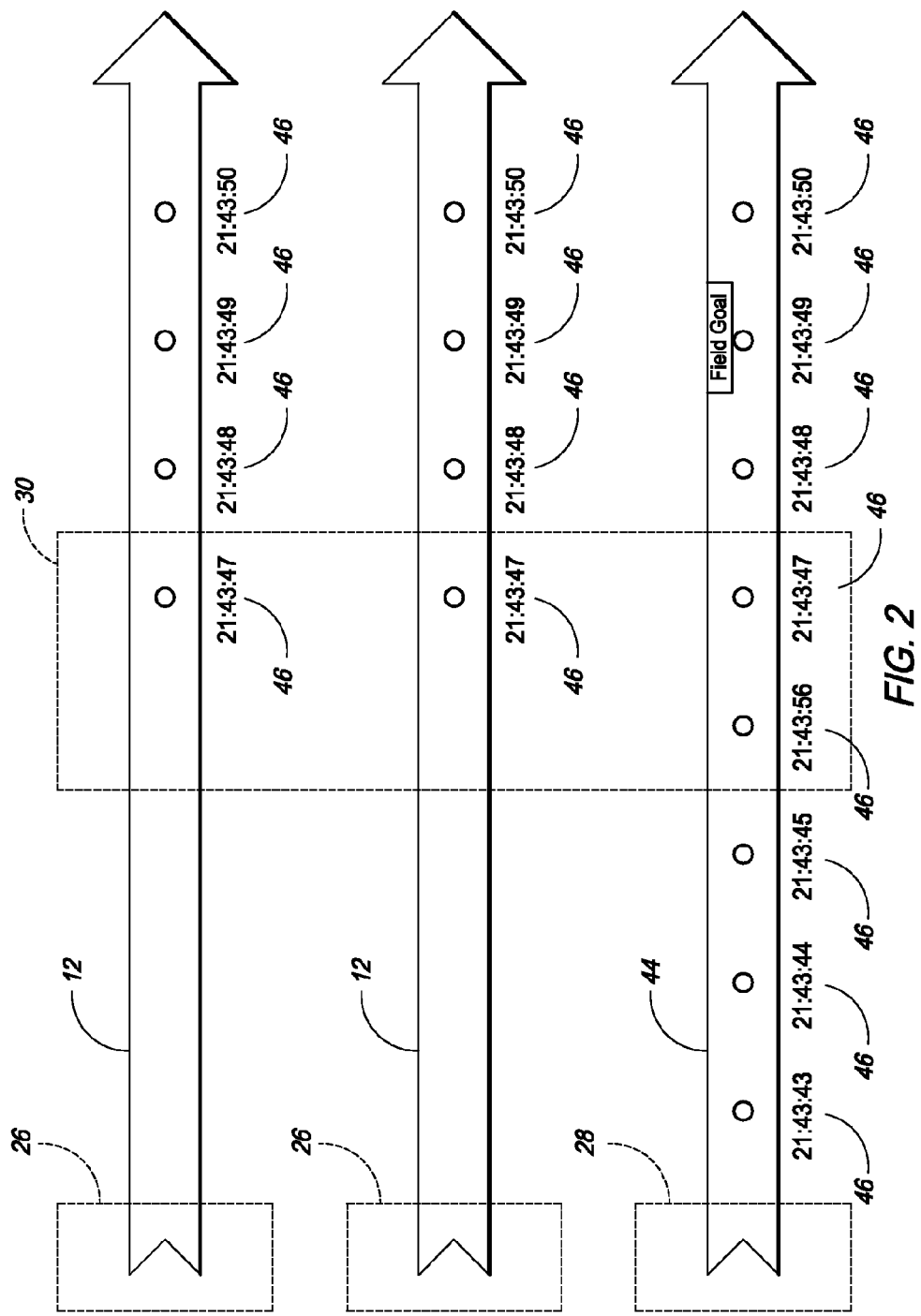
FIG. 2 illustrates the processing of video streams and data streams by a manager server, according to certain embodiments.

FIG. 2 illustrates the processing of video streams 12 and data streams 44 by manager server 30, according to certain embodiments. The depiction of two video streams 12 and one data stream 44 is for illustrative purposes only as the actual number of each stream may be varied as needed based on the event 16. As described above, manager server 30 may receive one or more video streams 12 for a particular event 16. Each video stream 12 for event 16 may be associated with a respective camera angle. For example, one video stream 12 for a football game may be from a sideline camera 26 and another video stream 12 for the football game may be from an end-zone camera 26. Thus, manager server 30 may receive more than one video stream 12 for a particular event 16. Similarly, manager server 30 may receive more than one data stream 44 for a particular event 16.

Manager server 30 may receive video stream 12 in any suitable format. For example, video stream 12 may be in a Material eXchange Format (MXF), an Advanced Authoring Format (AAF), a Broadcast Wave Format (BWF), an MPEG format, and/or any suitable format. Manager server 30 may receive video stream 12 in real-time or near real-time as raw video that is not tagged with time stamps 46. Manager server 30 may process video stream 12 at least in part by tagging one or more frames of video stream 12 with time stamps 46. As explained above, time stamps 46 may be based on a universal time scale. Thus, time stamp 46 that is appended to or associated with a particular frame in video stream 12 may be independent of the time elapsed since the start of video stream 12.

Manager server 30 may tag all or a subset of the frames in video stream 12 with time stamps 46. In some embodiments, manager server 30 may periodically tag frames in video stream 12 depending on the frame rate of video stream 12. For example, if the frame rate of video stream 12 is sixty frames per second, manager server 30 may append time stamp 46 to every sixtieth frame in video stream 12 (i.e., one time stamp 46 for each second). It should be understood, however, that manager server 30 may append time stamps 46 to video stream 12 according to any suitable interval. As explained above, although the term "video stream" is used herein to describe the feed from a camera 26, it should be understood that video stream 12 may comprise video and/or audio data.

In the illustrated embodiment, manager server 30 receives data stream 44 for event 16 from data console 28. As illustrated, data stream 44 may have already been tagged with time stamps 46 by the data console 28. In such embodiments, the time scale used by the data console 28 to tag data stream 44 may be the same as the time scale used by manager server 30 to tag video stream 12 with time stamps 46. In other embodiments, the tagging of data stream 44 with time stamps 46 may be performed by manager server 30 rather than data console 28.

Manager server 30 may receive data stream 44 from data console 28 over one or more IP sockets. Data stream 44 may be formatted in Extensible Markup Language (XML) or other suitable format. Manager server 30 may compare time stamps 46 in data stream 44 for event 16 with time stamps 46 in video streams 12 for the event 16 to determine the particular plays 22 in game data 14 that correlate with particular frames in video streams 12 for the event 16. Manager server 30 may store the tagged data streams 44 and video streams 12 in database 56 in storage module 52.

FIG. 3 illustrates a database 56 in storage module 52 in system 10, according to certain embodiments. Database 56 may be any suitable type of database 56 such as, for example, a Structured Query Language (SQL) database, an object-oriented database, an XML database, a network database, and/or a hierarchical database. Database 56 may comprise a plurality of data tables. For example, database 56 may comprise one or more game data tables 64 and one or more video data tables 66.

Game data table 64 may comprise game data 14 for a plurality of events 16. In particular, game data table 64 may comprise a record 68 for each play 22 that occurred in one or more events 16. For a particular play 22, record 68 in game data table 64 may comprise a description of play 22, the identity of participants 40 involved in play 22, the time stamp 46 associated with play 22, and a unique identifier 70 of the particular event 16 in which the play 22 occurred. For example, in the illustrated game data table 64, the first record 68 is associated with play 22 that occurred in event 16 associated with Identifier X. The first record 68 indicates that play 22 was a blocked shot by Player B that occurred at 21:43:10 UTC. Game data table 64 may comprise game data 14 for different events 16 and different types of plays 22. Although the illustrated game data table 64 illustrates particular data fields, it should be understood that game data table 64 may comprise any suitable number, type, and combination of data fields.

Video data table 66 may comprise and/or reference one or more video streams 12 for each of a plurality of events 16. Each video stream 12 in storage module 52 may be associated with a respective record 68 in video data table 66. For a particular video stream 12, record 68 in the video data table 66 may comprise a description of the event 16, an identifier 70 of the event 16, the time stamp 46 at the start of the video stream 12, and the duration of video stream 12. For example, in the illustrated video data table 66, the first record 68 is associated with a basketball game between the Lakers and the Celtics. The first record 68 indicates that the basketball game started at 21:05:00 UTC and that the duration of the video stream 12 is 03:31:00. Video data table 66 may comprise and/or reference video streams 12 for different camera angles. Although the illustrated video data table 66 illustrates particular data fields, it should be understood that video data table 66 may comprise any suitable number, type, and combination of data fields.

In operation, system 10 may use game data table 64 and video data table 66 to respond to queries 20 from users 18. In particular, system 10 may cause client 34 to display game data 14 for a particular event 16. User 18 may have an interest in a particular play 22 that occurred in event 16. Accordingly, user 18 may use client 34 to submit a query 20 for the video clip 24 associated with the particular play 22. Upon receiving the query 20, content server 32 may identify the record 68 in the game data table 64 that is associated with the particular play 22. In the identified record 68, content server 32 may identify the time stamp 46 associated with the particular play 22. Using the identifier 70 of event 16, the content server 32 may refer to video data table 66 to determine the associated video stream 12. Using the time stamp 46 associated with the particular play 22, the content server 32 may retrieve from the video stream 12 the particular video clip 24 that occurred at or around the time indicated in the particular time stamp 46. Content server 32 may cause client 34 to display the retrieved video clip 24 to user 18. Thus, content server 32 may use database 56 to retrieve video clips 24 for any play 22 that occurred in event 16.

Figure 4:
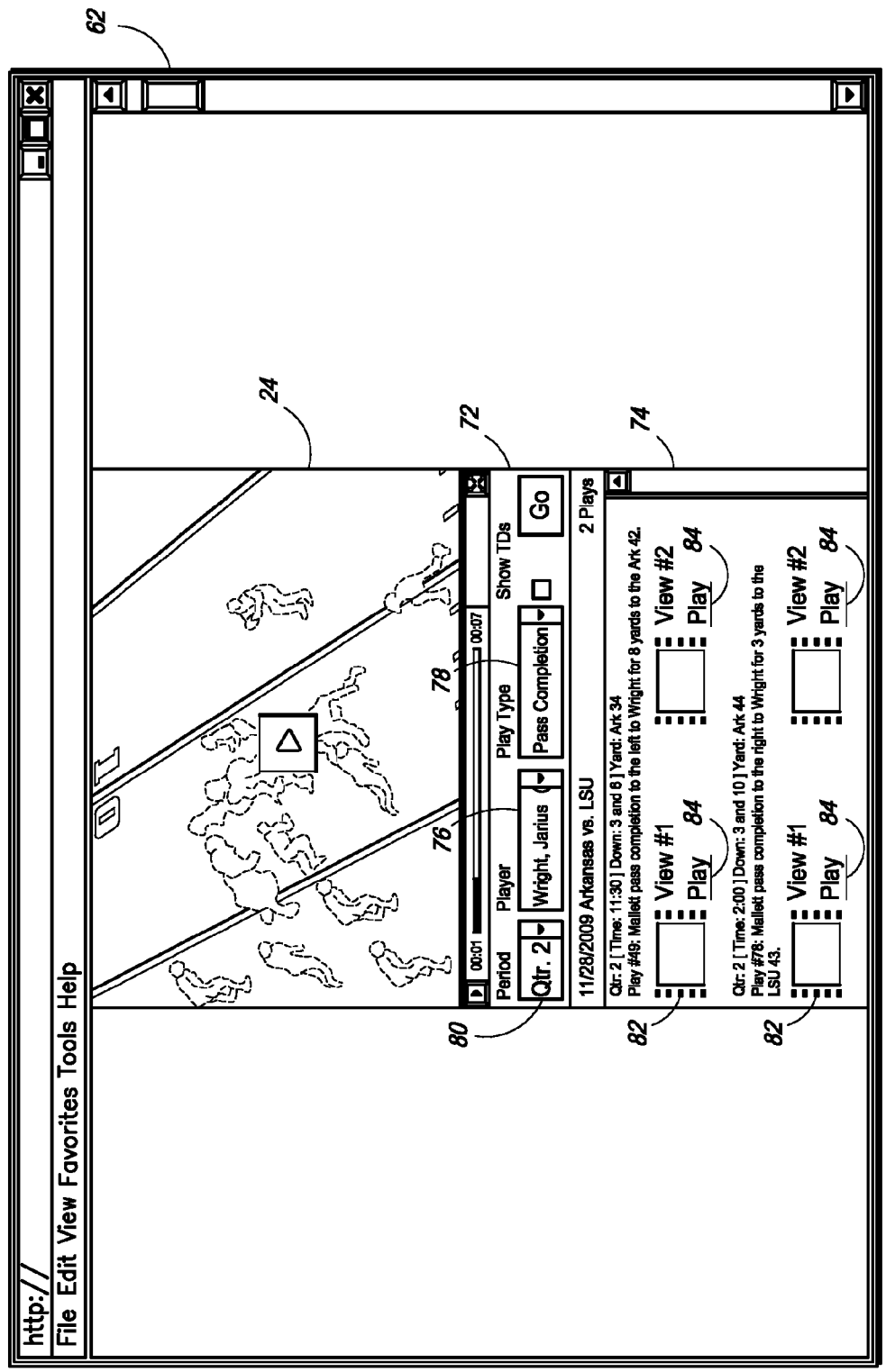
FIG. 4 illustrates a graphical user interface (GUI) that displays video clips and game data for events, according to certain embodiments.

FIG. 4 illustrates a graphical user interface (GUI) 62 that displays video clips 24 and game data 14 for events 16, according to certain embodiments. GUI 62 may comprise a query section 72 and a results section 74. Query section 72 may comprise one or more fields that allow a user 18 to formulate a query 20 based on game data 14. In particular, the user 18 may formulate query 20 by defining a particular play 22 in the query section 72. The particular play 22 may be defined by any suitable parameters such as, for example, the name of participant 40 involved in play 22, the type of play 22, and/or the period (e.g., quarter, half, inning, etc.) of event 16 in which play 22 occurred. Query section 72 may comprise at least one participant field 76, play type field 78, and period field 80.

User 18 may use participant field 76 to specify a particular participant 40 in an event 16. In some embodiments, participant field 76 comprises a drop-down menu that displays the names of multiple participants 40 in an event 16. In the illustrated example, user 18 formulated query 20 for plays 22 that occurred in a football game between the University of Arkansas and Louisiana State University. In this example, user 18 selected participant 40 named "Jujus Wright" in participant field 76 of query section 72.

User 18 may use play type field 78 to specify a particular type of play 22 that occurred in event 16. Play type field 78 may comprise a drop-down menu that displays multiple types of plays 22. In the illustrated example, user 18 selected "Pass Completion" in play type field 78 of query section 72. The available types of plays 22 that are displayed in the play type field 78 may be filtered based on a participant 40 previously selected in the participant field 76 of the query section 72.

User 18 may use period field 80 to specify a particular period (e.g., quarter, half, inning, etc.) in which play 22 occurred during event 16. Period field 80 may comprise a drop-down menu that displays multiple periods. In the illustrated example, user 18 selected "Quarter 2" in period field 80 of query section 72. Accordingly, user 18 in the illustrated example formulated query 20 for all plays 22 in which Jujus Wright caught a pass during the second quarter of the selected football game. User 18 may submit the query 20 to content server 32 by selecting the "GO" button in GUI 62.

In response to receiving query 20, content server 32 may identify one or more plays 22 in game data table 64 in database 56 that satisfy query 20. Content server 32 may display the results of query 20 in results section 74 of GUI 62. Results section 74 may comprise one or more play fields 82 and one or more video links 84. Play field 82 may describe a particular play 22 that satisfied query 20. For example, play field 82 may comprise the game time and a description of the game situation at the time of play 22 (e.g., down and distance, team with possession, etc.).

In association with each play field 82, GUI 62 may display one or more video links 84. By selecting video link 84 associated with a particular play 22, user 18 may cause GUI 62 to display video clip 24 of the particular play 22. GUI 62 may display a respective video link 84 for each camera angle that captured the particular play 22.

In the illustrated example, content server 32 determined that two plays 22 satisfied query 20. In other words, content server 32 determined that Jarius Wright caught two passes during the second quarter of the selected game. Each of the two plays 22 was captured by two camera angles. Thus, results section 74 in the illustrated example comprises two video links 84 for each play 22. By selecting video link 84, user 18 may cause GUI 62 to display video clip 24 of a particular play 22. GUI 62 may permit user 18 to customize the length of video clips 24. For example, user 18 may configure video clips 24 to be five seconds long, ten second long, or any suitable duration.

In some embodiments, system 10 may allow user 18 to efficiently create a compilation of video clips 24 of multiple plays 22 from one or more events 16. Thus, system 10 may perform video editing in real-time or near real-time. System 10 may allow user 18 to formulate a query 20 that specifies a set of games, a particular participant 40, and/or a particular type of play 22. For example, user 18 may formulate a query 20 for all "slam dunks" made by a particular participant 40 (e.g., player) during a season. In response to query 20, system 10 may retrieve a plurality of video clips 24 that satisfy query 20. System 10 may merge video clips 24 into a single video. Thus, in response to query 20 in the foregoing example, system 10 may generate a video that shows each of the slam dunks made by the specified participant 40 during the season.

Although FIG. 4 illustrates GUI 62 comprising particular query 20 and result fields, it should be understood GUI 62 may comprise any number and combination of query and result fields.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A video processing method comprising:
receiving at least one video stream associated with an event, the at least one video stream including a video frame for a play that occurred in the event;
receiving at least one data stream including event data for the event, the event data being independent of the video stream and being associated with the play that occurred in the event;
tagging the at least one video stream with a time stamp, the video frame being associated with the time stamp, the time stamp representing when the play in the video frame occurred, and the time stamp being based on a universal time scale that is independent of the at least one video stream;
correlating the video frame in the at least one video stream with the event data in the at least one data stream based at least in part on the time stamp and on a time stamp associated with the event data, the event data time stamp representing when the play in the event data occurred and the event data time stamp being based on the same time scale as the time stamp; and
recording the correlation of the video frame and the event data in records of a database stored in a memory.

2. The method of claim 1 wherein the event is a sporting event.

3. The method of claim 1 wherein the event data comprises game data.

4. The method of claim 1 wherein the video frame is comprised by a video clip containing a plurality of sequential video frames.

5. The method of claim 1 further comprising a manager server tagging the at least one data stream with the event data time stamp.

6. The method of claim 1 further comprising a data console tagging the at least one data stream with the event data time stamp.

7. The method of claim 1 wherein receiving the at least one video stream, receiving the at least one data stream, tagging the at least one video stream, and correlating the video frame are each performed by a processor of a manager server.

8. The method of claim 1 wherein the at least one video stream comprises a plurality of video frames for the play and the tagging comprises tagging the at least one video stream with a plurality of time stamps, each of sequential video frames of the plurality of video frames being associated with sequential time stamps of the plurality of time stamps.

9. The method of claim 1 further comprising storing the at least one video stream in the memory, wherein the database comprises an event data table and a video data table, the event data table including a record containing entries in data fields for a unique event identifier, for a description of the play, and for the event data time stamp of the play, and the video data table including another record containing entries in data fields for the unique event identifier and for a reference to the at least one video stream stored in the memory.

10. The method of claim 1 wherein the at least one video stream comprises a video stream for one camera angle associated with the event and a video stream for another camera angle associated with the event.

11. The method of claim 1 further comprising at least one observer of the game inputting the event data into at least one data console and the at least one data console transmitting at least one data stream, which is received by a manager server.

12. A video processing method comprising:
receiving a query to retrieve a video frame for a play that occurred in an event, the query including event data;
searching for the queried event data in a database stored in a memory;
the database having an event data table and a video data table, the event data table including at least one record containing entries in data fields for a unique event identifier, for a description of the play, and for an event data time stamp of the play, and the video data table including at least one other record containing entries in data fields for the unique event identifier and for a reference to at least one video stream associated with the event and stored in the memory;
the at least one video stream including the video frame and being tagged with a time stamp, the video frame being associated with the time stamp and the time stamp representing when the play in the video frame occurred, wherein the time stamp is based on a universal time scale that is independent of the at least one video stream;
the event data in the query matching the description of the play in the at least one record of the event data table;
determining the event identifier and the event data time stamp in the at least one record of the event data table;
using the event identifier from the event data table, determining the reference to the at least one video stream in the video data table and locating the at least one video stream in the memory; and
using the event data time stamp from the event data table, locating the video frame in the located at least one video stream and transmitting the video frame.

13. The method of claim 12 wherein the event is a sporting event.

14. The method of claim 12 wherein the event data comprises game data.

15. The method of claim 12 wherein the video frame is comprised by a video clip containing a plurality of sequential video frames and transmitting the video frame includes transmitting the video clip.

16. The method of claim 12 wherein the time stamp is based on a time scale that is independent of the at least one video stream.

17. The method of claim 12 wherein receiving the query, searching for the event data, determining the event identifier, determining the reference, and locating the video frame are each performed by a processor of a content server.

18. The method of claim 12 wherein the at least one video stream comprises a plurality of video frames for the play and is tagged with a plurality of time stamps, each of sequential video frames of the plurality of video frames being associated with sequential time stamps of the plurality of time stamps.

19. The method of claim 12 wherein the at least one video stream comprises a video stream for one camera angle associated with the event and a video stream for another camera angle associated with the event.

20. The method of claim 12 wherein the database and the at least one video stream are stored in different modules of the memory.

21. The method of claim 12 wherein the event data table comprises a plurality of records for the same event containing identical entries in the data field for the event identifier but different entries in the description of the play field and the event data time stamp field.

22. The method of claim 12 wherein the received query originates from a graphical display of statistical data as a result of a user selecting the statistical data.

23. The method of claim 22 wherein the graphical display comprises a box score for the event and the statistical data selected comprises data in the box score associated with the play that occurred in the event and appears in the transmitted video frame.

24. The method of claim 12 wherein the event data table comprises a plurality of records containing entries in the description of the play field that match the event data in the query, the transmission of the video frame including transmitting a plurality of located video frames from different ones of the at least one video stream.

25. The method of claim 24 further comprising compiling the located video frames into a compiled video stream lacking video frames that do not satisfy the query and transmitting the compiled video frame.

26. A video processing method comprising:
receiving a query to retrieve a video clip for each of a plurality of plays that occurred in at least one event, the query including event data, the video clips including at least one video frame, and the plays being separated in time;
searching for the event data in a database stored in a memory;
the database having a reference to at least one video stream associated with the at least one event and stored in the memory;
the at least one video stream including the video clip for each of the plurality of plays and being tagged with time stamps, the video clips being associated with the time stamps and the video clip time stamps representing when the plays in the video clips occurred, wherein the time stamps are based on a universal time scale that is independent of the at least one video stream;
the event data in the query matching descriptions of the plays in a plurality of records in the database;
using the plurality of records in the database, determining the reference to the at least one video stream and locating the at least one video stream in the memory;
using the time stamps, locating the video clip for each of the plurality of plays in the located at least one video stream;
compiling the located video clips into a compiled video stream lacking video frames that do not satisfy the query and transmitting the compiled video frame.

27. The method of claim 26 wherein the event is a sporting event.

28. The method of claim 26 wherein the event data comprises game data.

29. The method of claim 26 wherein the video frame time stamp is based on a time scale that is independent of the at least one video stream.

30. The method of claim 26 wherein receiving the query, searching for the event data, determining the reference, and locating the video clips are each performed by a processor of a content server.

31. The method of claim 26 wherein compiling the located video clips is performed automatically by a processor of a content server without user intervention.

32. The method of claim 26 wherein the at least one video stream comprises a plurality of video frames for the play and is tagged with a plurality of time stamps, each of sequential video frames of the plurality of video frames being associated with sequential time stamps of the plurality of time stamps.

33. The method of claim 26 wherein the at least one video stream comprises a video stream for one camera angle associated with the event and a video stream for another camera angle associated with the event.

34. The method of claim 26 wherein the database and the at least one video stream are stored in different modules of the memory.

35. The method of claim 26 wherein the received query originates from a graphical display of statistical data as a result of a user selecting the statistical data.

36. The method of claim 35 wherein the graphical display comprises a box score for one event and the statistical data selected comprises data in the box score associated with each of the plurality of plays that occurred in the one event and appear in the compiled video stream.

37. A video processing method comprising:
receiving at least one video stream associated with an event, the at least one video stream including a video frame for a play that occurred in the event;
receiving at least one data stream including event data for the event, the event data being independent of the at least one video stream and being associated with the play that occurred in the event;
tagging the at least one video stream with a time stamp, the video frame being associated with the time stamp, the time stamp representing when the play in the video frame occurred, and the time stamp being based on a universal time scale that is independent of the at least one video stream;
correlating the video frame in the at least one video stream with the event data in the at least one data stream based at least in part on the time stamp and on a time stamp associated with the event data, the event data time stamp representing when the play in the event data occurred and the event data time stamp being based on the same time scale as the time stamp;
recording the correlation of the video frame and the event data in records of a database stored in a memory;
receiving a query to retrieve the video frame, the query including event data;
searching for the queried event data in the database;
the database having an event data table and a video data table, the event data table including at least one record containing entries in data fields for a unique event identifier, for a description of the play, and for an event data time stamp of the play, and the video data table including at least one other record containing entries in data fields for the unique event identifier and for a reference to at least one video stream associated with the event and stored in the memory;
the event data in the query matching the description of the play in the at least one record of the event data table;
determining the event identifier and the event data time stamp in the at least one record of the event data table;
using the event identifier from the event data table, determining the reference to the at least one video stream in the video data table and locating the at least one video stream in the memory; and
using the event data time stamp from the event data table, locating the video frame in the located at least one video stream and transmitting the video frame.

38. The method of claim 37 wherein the event data table comprises a plurality of records containing entries in the description of the play field that match the event data in the query and locating the video frame includes locating a plurality of video frames from different ones of the at least one video stream, the method further comprising compiling the located video frames into a compiled video stream lacking video frames that do not satisfy the query and the transmitting includes transmitting the compiled video frame.

39. The method of claim 38 wherein the received query originates from a graphical display of statistical data as a result of a user selecting the statistical data.

40. The method of claim 39 wherein the graphical display comprises a box score for the event and the statistical data selected comprises data in the box score associated with the compiled video stream.

41. A video processing system, comprising:
a memory that stores at least one data stream comprising game data for a sporting event, the game data associated with a plurality of plays that occurred in the sporting event; and
at least one processor that is communicatively coupled to the memory and that:
receives at least one video stream associated with the sporting event, the video stream comprising a respective set of video frames for each of the plurality of plays that occurred in the sporting event;
tags the at least one video stream with a plurality of time stamps such that a particular video frame is associated with a time stamp representing when a play associated with the video frame occurred, each of the plurality of time stamps based on a universal time scale that is independent of the video stream;
correlates the at least one video stream with the game data in the at least one data stream based at least in part on the plurality of time stamps;
in response to a query specifying game data for a particular play, determines a video clip of the particular play in the at least one video stream, the determination being based at least in part on one or more time stamps associated with the specified game data; and
causes a graphical user interface to display the video clip.

42. The system of claim 41 wherein the at least one processor comprises a processor of a manager server that receives, tags, and correlates the at least one video stream and a processor of a content server that determines the video clip of the particular play.

* * * * *